Aug. 9, 1932.   R. E. McGAHEY   1,870,524
GREASE GUN
Filed July 22, 1930
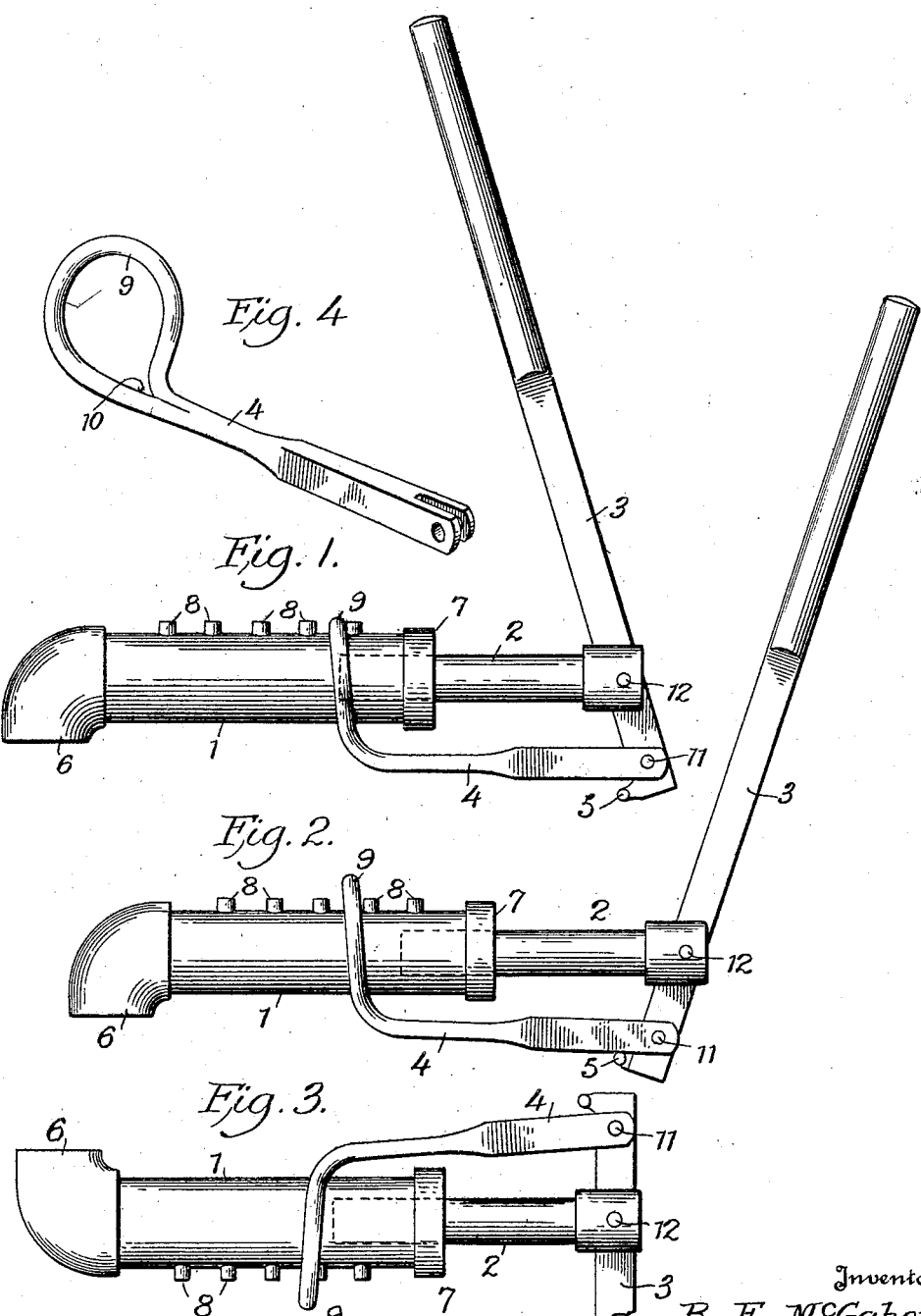

Patented Aug. 9, 1932

1,870,524

UNITED STATES PATENT OFFICE

ROBERT E. McGAHEY, OF ALEXANDRIA, VIRGINIA, ASSIGNOR TO RELIANCE MACHINE & STAMPING WORKS, INCORPORATED, OF NEW ORLEANS, LOUISIANA, A CORPORATION OF LOUISIANA

GREASE GUN

Application filed July 22, 1930. Serial No. 469,747.

This said invention relates to a grease gun which is simple in construction and efficient in operation.

An object of the invention is to provide a grease gun which is portable and manually operable and in which the several parts are attached in such a way that it may be easily operated and refilled without the several parts becoming separated.

Referring to the drawing which is made a part of the specification and in which similar reference characters indicate similar parts:

Fig. 1 shows the grease gun in position for operation with the handle depressed for forcing the grease into the grease cup or bearing to be lubricated, Fig. 2 is a similar view with the handle raised for the purpose of moving the link or pawl upon the cylinder of the gun preparatory to forcing the piston further into the cylinder, Fig. 3 shows the gun in reversed position to that shown in Figs. 1 and 2 with the link or pawl resting upon the smooth side of the cylinder and free from engagement with the lugs or projections upon the opposite side of the cylinder, and Fig. 4 is a perspective view of a link or pawl which is used for obtaining a step by step operation of the gun.

The grease gun of the invention as illustrated in the drawing comprises a cylinder 1 provided with a close fitting piston 2 which is operated by means of the lever 3 pivoted at 12 on the piston 2 and pivoted at 11 to the link or pawl 4 which has an eye 9 surrounding the body of the cylinder and adapted to engage the lugs or projections 8 mounted in a straight line on the cylinder.

These lugs or projections may be cast with the cylinder or tapped therein. The end of the cylinder in which the piston 2 works is provided with a collar or ring 7 which may be integral therewith or screw-threaded thereon or attached thereto in any suitable manner. The opposite end of the cylinder is provided with an elbow or other suitable connection 6 which may be threaded on the cylinder or attached thereto by other means. This connection 6 may be provided with a bayonet slot or other suitable connection for attachment to a grease cup or plug or other device through which or whereby the lubricant is to be fed to the bearing or part to be lubricated.

To fill the grease gun the eye of the pawl is moved to the right in Figs. 1, 2 and 3 into engagement with the collar or ring 7 in which position the piston 2 may be disengaged from the cylinder and a stick of hard grease or other lubricant inserted therein whereupon the piston is again inserted in the cylinder and the handle 3 manipulated to move the eye 9 over the first lug on the cylinder whereupon depression of the handle 3 will force the grease stick into the cylinder and through it to the grease cup. To further compress the grease stick the handle 3 is moved to the right in Fig. 1 whereupon the lug carrying the T-head 5 on the end of the handle will bring the T-head 5 into engagement with the link 4 and raise the eye 9 over the next lug 8 on the cylinder whereupon reversal of movement of the handle 3 will permit the eye 9 to drop behind the second lug 8 and further movement of the handle 3 will force the piston 2 further into the cylinder forcing out additional grease. This operation may be repeated until the piston 2 is forced entirely into the cylinder. To refill the cylinder the link 4 may be raised so that the eye 9 will be free from the lugs 8 whereupon the piston may be pulled out of the cylinder. As an alternative operation the handle 3 may be pulled to the right as in Fig. 2 whereupon the T-head 5 will lift the eye 9 free of the lugs 8 permitting the piston to be withdrawn from the cylinder. Another manner of manipulating the device to withdraw the piston is by turning the handle with respect to the cylinder until the body of the link or pawl 4 rests above the lugs 8 whereupon the piston may be directly withdrawn from the cylinder since the body of the link will rest upon the lugs and the portion 10 of the link will permit the lugs to slide through the eye 9 without engagement therewith in a manner to prevent withdrawal of the piston.

It will be seen from the above description considered in connection with the drawing that there has been provided a very simple and easily manipulated grease gun which is rugged in construction and efficient in operation.

Having thus fully described my invention, what I claim and desire to secure by Letters Patent is:

1. In a grease gun in combination, a cylinder, a piston working in said cylinder, a lever for operating said piston and having a pawl pivoted thereto and surrounding the body of said cylinder and movable longitudinally thereof.

2. In a grease gun, in combination, a cylinder having a series of projections thereon, a piston working in said cylinder, a lever pivoted to said piston and a pawl connected to the end of said lever and having an eye portion surrounding said cylinder and cooperating with said projections to give a step-by-step movement by said piston upon manipulation of said lever.

3. A grease gun comprising in combination, a cylinder having a series of lugs thereon, a piston operating in said cylinder, a lever pivoted to said piston and a pawl pivoted to said lever and cooperating with said lugs to give a step-by-step movement to said piston upon manipulation of said lever.

4. A grease gun comprising in combination, a cylinder having a series of lugs thereon, a piston working in said cylinder, a lever pivoted to said piston and a pawl attached to the end of said lever and having an eye surrounding said cylinder and cooperating with said lugs, and means carried by the end of said lever for lifting said pawl free of said lugs for step-by-step operation of said piston by operation of said lever.

5. A grease gun comprising in combination, a cylinder having a series of projections thereon, a pawl having an eye surrounding said cylinder and cooperating with said projections, a piston operating in said cylinder, and a lever connected to said piston and to said pawl, a collar on said cylinder to act as a stop for said pawl, said piston and pawl being so proportioned as to their length that said piston may be withdrawn from said cylinder for refilling.

6. A grease gun comprising in combination, a cylinder having a series of lugs located on the body portion thereof, a pawl cooperating with said lugs, a piston, and a lever directly pivoted to said piston and pawl and operative in combination therewith to give a step-by-step movement to said piston.

In testimony whereof I affix my signature.

ROBERT E. McGAHEY.